United States Patent [19]

Zwalve

[11] 4,433,857
[45] Feb. 28, 1984

[54] VEHICLE WITH INDIVIDUALLY SUSPENDED WHEELS

[76] Inventor: Albert Zwalve, F. Clockstraat 68, 9665 BD Oude Pekela, Netherlands

[21] Appl. No.: 279,851

[22] Filed: Jul. 2, 1981

[30] Foreign Application Priority Data

Jun. 22, 1981 [NL] Netherlands ............... 8103010

[51] Int. Cl.³ .................................. B60G 3/00
[52] U.S. Cl. ..................................... 280/690
[58] Field of Search ............ 280/690, 688, 689

[56] References Cited

U.S. PATENT DOCUMENTS 2,145,360 1/1939 Leighton ............... 280/690
2,193,137 3/1940 Leighton ............... 280/690

Primary Examiner—Richard A. Bertsch
Attorney, Agent, or Firm—Bernard, Rothwell & Brown

[57] ABSTRACT

A vehicle in which the extended stub axles of a wheel set cross each other and are pivoted on the pivot of the opposite spring carrier arm to form a composite pivot that is attached to a longitudinal frame member either direct or through a bracket.

This system of individual wheel suspension can be used in combination with Ackermann type steering systems.

2 Claims, 8 Drawing Figures

VEHICLE WITH INDIVIDUALLY SUSPENDED WHEELS

This invention relates to a vehicle with individually suspended wheels.

More specifically, the invention relates to a vehicle with a type of wheel suspension as disclosed in German Offenlegungsschrift No. 1,927,340, which describes a vehicle comprising a wheel set including at least two wheels, and a chassis frame which, as viewed in the normal direction of travel, includes a left-hand and a right-hand longitudinal member, from each of which an individually sprung wheel of said wheel set is suspended, via an arm, in a first pivot joint, both the left-hand wheel and the right-hand wheel having extended stub axles, the extensions of which cross each other and are pivotally suspended from said chassis frame in a second pivot joint adjacent to the opposite wheel of the wheel set, referred to hereinafter as a vehicle of the kind described.

In this prior wheel suspension system, each wheel is suspended from a swing arm extending next to the wheel and secured at its one end by means of a first pivot to a cross-beam of the chassis frame. Furthermore, the stub axle of each wheel is extended, and the end of the stub axle away from the wheel is secured by means of a second pivot to the cross-beam of the chassis frame as well. In the prior arrangement, the pivot of the extended stub axle of the left-hand wheel is placed next to the pivot of the swing arm of the right-hand wheel on the right-hand end of the cross-beam of the chassis frame. The cross-beam as it were forms the hinge pin of these pivots. Similarly, the pivot of the extended stub axle of the right-hand wheel is placed next to the pivot of the swing arm of the left-hand wheel on the left-hand end of said cross-beam.

The object of this design in the prior wheel suspension system is to provide a less heavy construction for the swing arms and for the bearings mounted around the cross-beam of the frame as compared to the previously applied arrangement, in which the stub axles extended sideways of the corresponding swing arms, owing to which they were subject to high torsional stresses.

The cross-beam which in the wheel suspension system disclosed in the German application 1,927,340 is required in the vicinity of the wheel suspension construction constitutes an obstacle which prevents the use of the system with individually suspended axles with an Ackermann type steering mechanism.

It is an object of the present invention to provide a system of individual wheel suspension of considerably improved construction, that is to say, of lighter construction, without thereby adversely affecting the general driving qualities of the vehicle, and which wheel suspension system is also suitable for use with axles steered by an Ackermann system and designed for axle loads of 10 t and even higher.

For this purpose, according to the invention, there is provided a vehicle of the kind described, which is characterized in that the first and second pivot joints associated with each wheel form a composite pivot joint consisting of two concentric component pivots rotatable one about the other, with each composite pivot joint being connected to the respective longitudinal frame member either direct or by means of a bracket.

By virtue of the fact that, in the wheel suspension construction according to the present invention, the reaction forces on the axle structure arising under the influence of loads on the vehicle are directly transmitted to the frame, the provision of a separate cross-beam is unnecessary, and the wheel suspension construction may be of lighter design.

Furthermore, owing to the fact that, according to the invention, the first and second pivot joints located on one side of the frame are mounted concentrically one around the other, the lines of action of the vertical forces acting in the corresponding first and second pivot joints coincide, and so do the working lines of the horizontal forces acting in these points, and hence it is prevented that the reaction force derived from the other wheel axle portion leads to the generation of a moment acting on the frame. As a consequence it is also possible to use a lighter bearing construction.

In addition to the above advantage of a generally lighter construction, the individual wheel suspension construction according to the invention with concentric first and second pivot joints, offers the advantage that it can be used with single- as well as dual-tyre arrangements without adversely affecting the driving characteristics of the vehicle. Furthermore, the absence of a cross-beam in the frame as a necessary element for securing the wheel suspension system offers the possibility of using the system with axles steered by the Ackermann system.

Thus in a suitable embodiment of the invention, a steering knuckle construction with a knuckle and an arm is mounted between each wheel and its associated extended stub axle, the two arms being coupled together by means of a tie rod so that the wheel can be steered.

Some embodiments of the invention will now be described, by way of example, with reference to the accompanying drawings, in which FIG. 1 is a diagrammatic top plan view of a wheel set consisting of two wheels individually suspended from a chassis frame comprising longitudinal members, one wheel being shown as a dual wheel and the other as a single wheel, and showing, in accordance with the present invention, the first and second pivot joints mounted concentrically one around the other;

Figure 1:
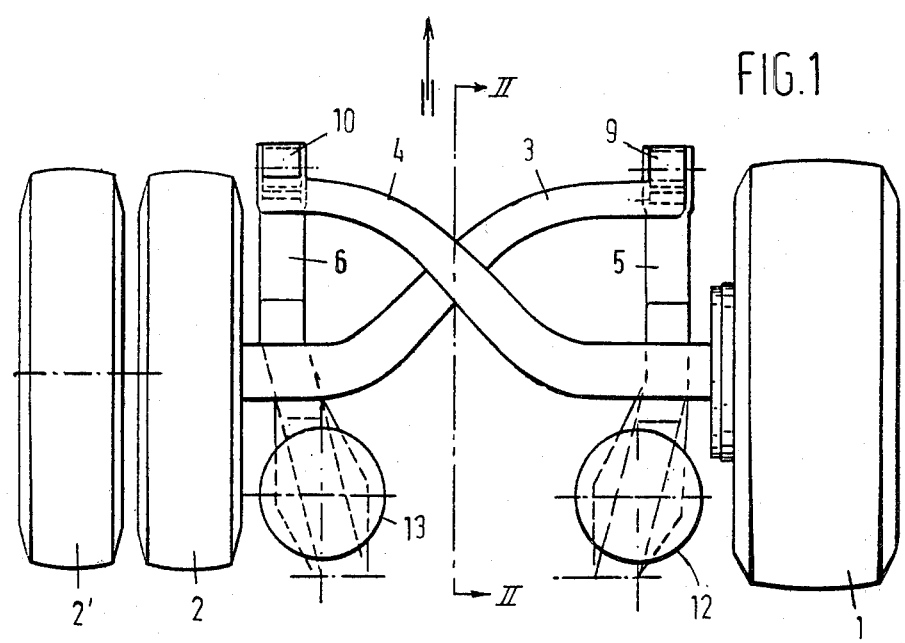
Figure 2:
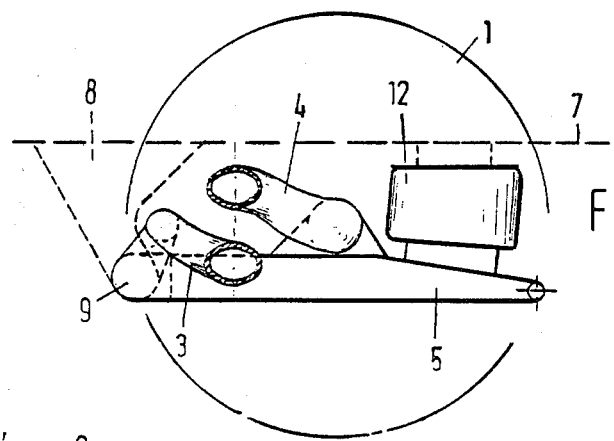
FIG. 2 is a cross-sectional view taken on the line II—II of FIG. 1.

Referring to the drawings, it will be noted that the normal direction of travel is indicated by an arrow. The wheel suspension system according to the invention is suitable for use with both single-wheel and dual-wheel arrangements, as shown in FIG. 1, which shows one half of both. Thus a single wheel 1 and a dual wheel 2, 2'-naturally provided with tyres-are respectively connected by means of extended stub axles 4 and 3 to spring carrier arms 5 and 6. In FIG. 2, the underside of a longitudinal frame member is shown at 7, with a bracket 8. Spring carrier arm 5 is connected at pivot joint 9 to bracket 8, which is associated with wheel 1. Similarly, spring carrier arm 6 is connected by means of a pivot joint 10 to a bracket (not shown) corresponding to bracket 8, associated with the other wheel, which in the embodiment shown is the dual wheel 2, 2'. For further support of the frame and to provide spring reactions, pneumatic springs 12 and 13 are mounted between the longitudinal frame members and the spring carrier arms 5 and 6, respectively. At pivot joints 9 and 10 the stub axles 3 and 4 are also pivoted to bracket 8 and the similar bracket (not shown) for wheel 2, 2', respectively. Accordingly, pivot joints 9 and 10 are each formed as a dual composite pivot joint, the component two pivots of which are mounted concentrically one around the other by means of rubber bearings, as shown in more detail in FIG. 4.

Figure 4:
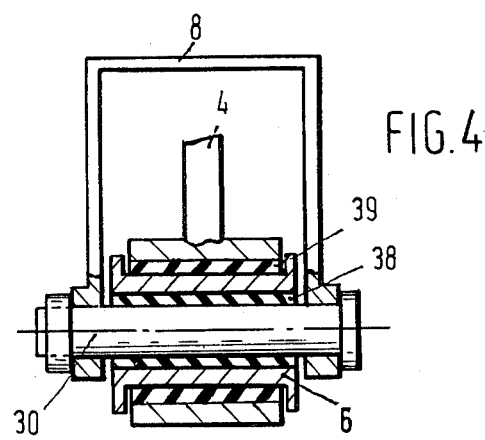
FIG. 4 shows the manner in which a pivot joint is mounted on a bracket connected to a longitudinal frame member (not shown)

FIG. 4 shows bracket 8 connected to a longitudinal frame member. Mounted in bracket 8 is a spindle 30, on which spring carrier arm 6 is pivoted by means of a rubber bearing 38. The extended stub axle 4 is, in turn, pivoted on the pivot of arm 6 via rubber bearing 39.

Figure 3:
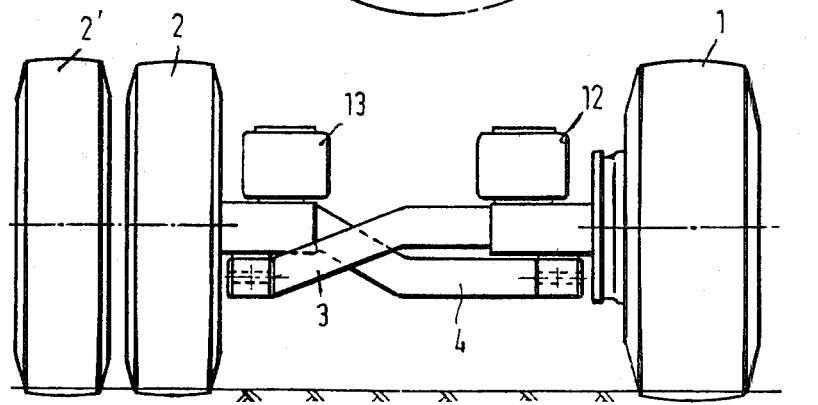
FIG. 3 shows the wheel set illustrated in FIG. 1 in rear view.
Figure 5:
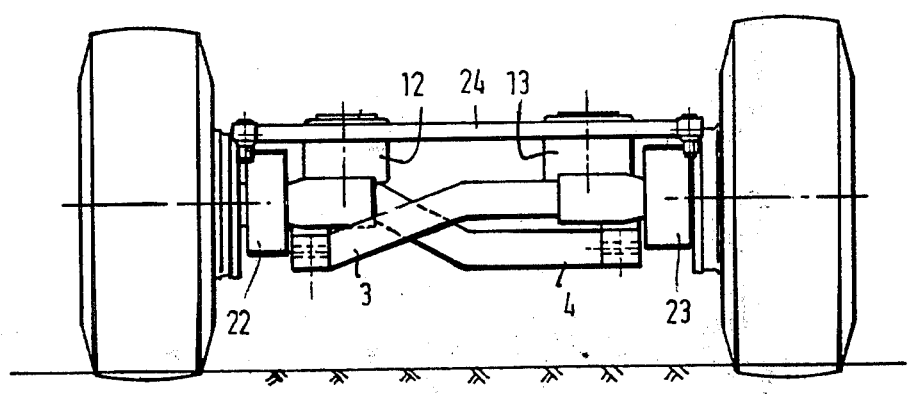
FIG. 5 shows a front elevational view of an individually suspended axle assembly for a semi-trailer, suitable for a designed axle load of 10 t and steerable by an Ackermann sytem.
Figure 6:
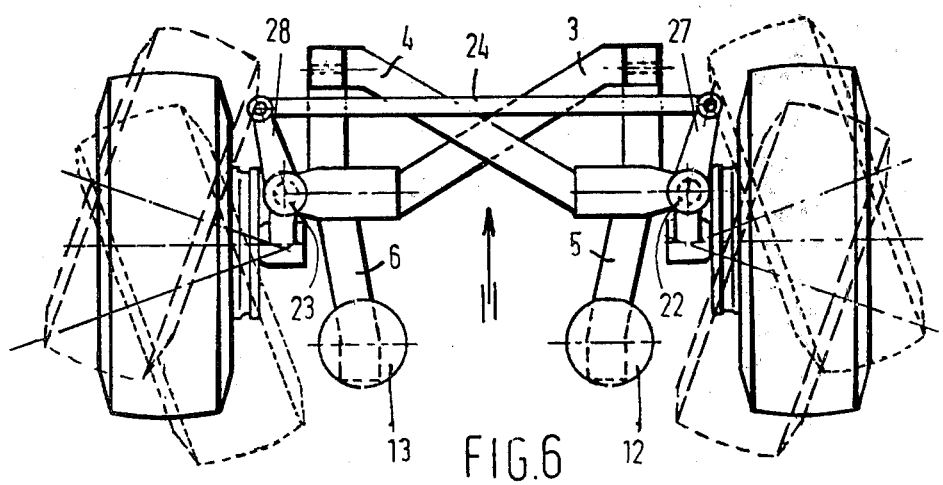
FIG. 6 shows the axle suspension construction of FIG. 5 in top plan view.

FIGS. 5 and 6 show a wheel suspension system according to the invention for an Ackermann type axle steering arrangement for a semi-trailer with a designed axle load of approximately 10 t. Corresponding elements of the suspension system according to the invention shown in FIGS. 1-3 and in FIGS. 5-6 are designated by the same reference numerals. The operation of the wheel suspension system shown in FIGS. 5-6 is analogous to that of the system shown in FIGS. 1-3. In the embodiment of FIGS. 5 and 6, the system comprises steering knuckles 22 and 23 provided in the conventional manner with arms 27, 28, which are connected by a tie rod 24.

Figure 7:
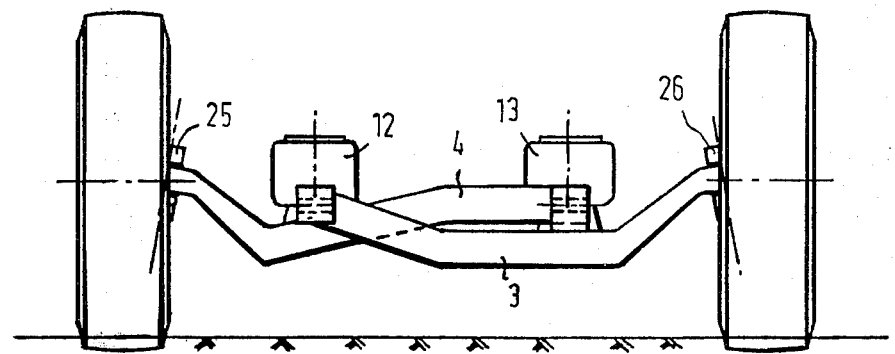
FIG. 7 shows a front elevational view of an individually suspended steerable front axle with a designed axle load of, for example, 7.5 t, and suitable for use with a motorlorry or bus.
Figure 8:
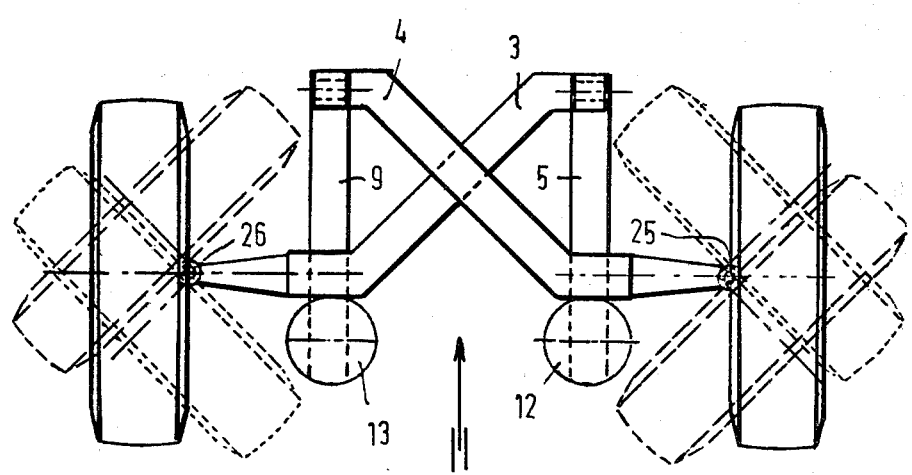
FIG. 8 shows the axle suspension construction of FIG. 7 in top plan view.

FIGS. 7 and 8 show a wheel suspension system according to the present invention that is suitable for use in a motorlorry or bus for an Ackermann type front axle steering arrangement with a designed axle load of approximately 7.5 t. The operation of the arrangement is analogous to that of the systems shown in FIGS. 1-3 and FIGS. 5-6. Corresponding elements are again designated by the same reference numerals. The steering knuckles are indicated at 25 and 26.

Naturally the individual wheel suspension system as described above and shown in the accompanying drawings can be modified without departing from the scope of the invention. Thus the wheel suspension system according to the invention is suitable for use with any type of chassis frame. Also, a plurality of axles can be placed one behind the other. It will be clear that the wheel suspension construction according to the invention is also highly dependent on the type of vehicle.

I claim:

1. A vehicle comprising a wheel set including at least two wheels, and a chassis frame which, as viewed in the normal direction of travel, includes a left-hand and a right-hand longitudinal member, from each of which an individually sprung wheel of said wheel set is suspended, via an arm, in a first pivot joint, both the left-hand wheel and the right-hand wheel having extended stub axles, the extensions of which cross each other and are pivotally suspended from said chassis frame in a second pivot joint adjacent to the opposite wheel of the wheel set, characterized in that the first and second pivot joints associated with each wheel form a composite pivot joint consisting of two concentric component pivots rotatable one about the other, with each composite pivot joint being connected to the respective longitudinal frame member either direct or by means of a bracket.

2. A vehicle as claimed in claim 1, characterized in that a steering knuckle construction with a knuckle and an arm is mounted between each wheel and its associated extended stub axle, the two arms being coupled together by means of a tie rod, so that the wheels can be steered.

* * * * *